United States Patent [19]
Knutson

[11] 3,985,194
[45] Oct. 12, 1976

[54] TILT CAB POWER STREAM AND VALVE CONTROL THEREFOR

[75] Inventor: Dale A. Knutson, Oconomowoc, Wis.

[73] Assignee: Applied Power Inc., Milwaukee, Wis.

[22] Filed: Aug. 30, 1974

[21] Appl. No.: 502,220

[52] U.S. Cl. .......................... 180/89 A; 296/28 C; 91/45; 60/400; 417/401; 296/35 R
[51] Int. Cl.² ......................................... B62D 33/06
[58] Field of Search ...................... 180/89 A, 89 R; 296/28 C, 35 R; 60/400, 405; 91/411 R, 403, 467, 44, 45, 41; 298/22 C, 22 P, 22 R, 38

[56] References Cited
UNITED STATES PATENTS

| | | | |
|---|---|---|---|
| 2,543,210 | 2/1951 | Wagstaff | 298/22 F |
| 3,041,975 | 7/1962 | Atherton et al. | 417/401 |
| 3,533,234 | 10/1970 | Futamata et al. | 60/400 |
| 3,667,566 | 6/1972 | Hopkins | 180/89 A |
| 3,706,470 | 12/1972 | Johnson | 180/89 A |
| 3,761,123 | 9/1973 | Neill et al. | 180/89 A |
| 3,797,882 | 3/1974 | Brimhall | 180/89 A |
| 3,801,151 | 4/1974 | Reynolds et al. | 180/89 A |
| 3,841,693 | 10/1974 | Reynolds et al. | 180/89 A |

*Primary Examiner*—Kenneth H. Betts
*Attorney, Agent, or Firm*—John J. Byrne; Edward E. Dyson

[57] ABSTRACT

A hydraulic system and latching mechanism for a cab tiltably mounted to the chassis of a vehicle. The cab is normally disposed over the engine of the vehicle and is pivotally attached to the chassis at its forward end for movement through 90°. The cab is powered by an air-motor-actuated hydraulic pump which energizes lifting cylinders disposed between the chassis and cab. When the system is energized, a hydraulically actuated latch is released prior to commencement of the tilting movement of the cab. A direction-control valve is employed which, when in the neutral or closed position, utilizes the pressures generated in the hydraulic system by the weight of the tilted cab in certain positions to assist the valve in sealing the reservoir port in the valve against leakage thereby preventing the cab from creeping.

10 Claims, 10 Drawing Figures

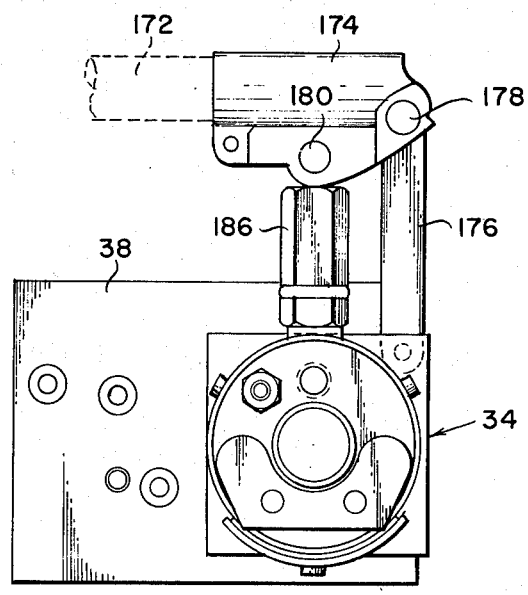
Fig. 8
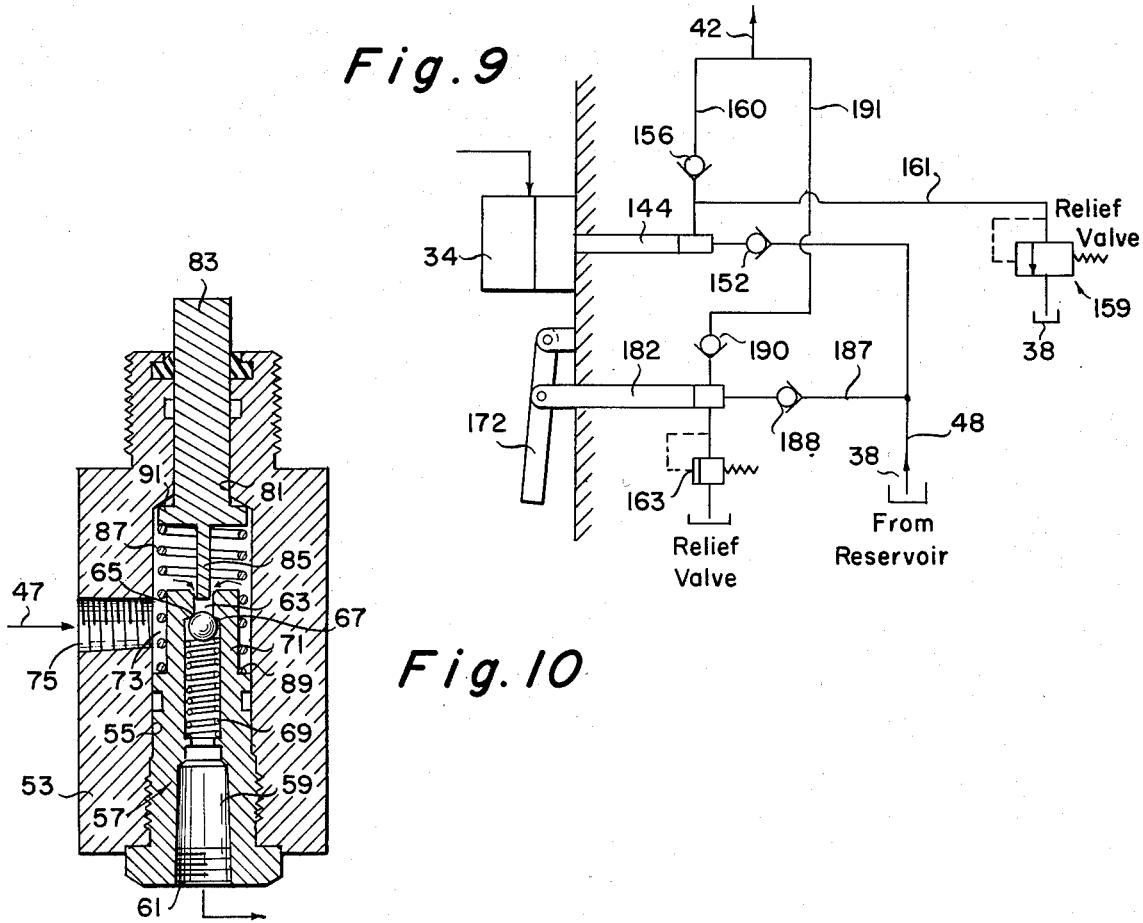
Fig. 9
Fig. 10

TILT CAB POWER STREAM AND VALVE CONTROL THEREFOR

BACKGROUND AND FIELD OF INVENTION

This invention is primarily directed for use with vehicles wherein an operator cab is mounted over the vehicle engine and is tiltable through approximately 90° to expose and permit access to the engine when required. The cab is pivoted to the chassis of the vehicle at its forward end and lifting means, usually hydraulic cylinders extending between the chassis and the cab, are provided for pivoting the cab through 90° and past the over-the-center or 45° position. The weight of the cab tends to nest the pistons within the cylinders during the travel of the cab from a 0° position to the 45° position; however, once the cab passes the over-the-center or 45° position, it exerts a pulling force on the pistons within the cylinders.

This invention is directed toward improvements in tilt cab hydraulic systems and particularly in the power unit and the directional control valve.

The power unit of this invention employs an air-motor-actuated hydraulic pump. Similar pumps are disclosed in assignee's U.S. Pat. No. 3,041,975, dated July 3, 1962; entitled FLUID ACTUATED HYDRAULIC POWER UNIT and U.S. Pat. NO. 3,079,900, dated Mar. 5, 1963; entitled FLUID MOTOR. The hydraulic power unit of this invention is further provided with a manual override which permits manual operation of the pump in the event of an air-power failure.

One of the major deficiencies in the prior art resides in stabilizing the tilted cab in a selected position. In most systems, even though the directional valve is in a neutral or closed position, the cab, when in positions other than the fully seated or fully tilted positions, tends to creep downwardly toward its seated or fully tilted position because of leakage within the valve to the tank or reservoir port.

Therefore, it is an objective of this invention to provide an improved hydraulic power unit for actuating the lifting cylinders in a tilt cab vehicle.

It is a further objective of this invention to provide an air-motor-actuated hydraulic pumping unit wherein the hydraulic motor is provided with a manual pumping mechanism useful as an override in the event of a pneumatic failure.

It is a further objective of this invention to provide a directional control valve for a tilt cab wherein the forces generated by the weight of the cab acting on the lifting cylinder are translated through the hydraulic system to the movable element of the valve forcing it into tight engagement with the wall of the housing of the valve surrounding the reservoir port to minimize leakage to the reservoir from the cylinders. In this way, creeping of the cab when its weight is supported by the cylinders is minimized.

It is a further objective of this invention to provide a hydraulic power system for a tilt-cab vehicle including a hydraulically actuated latch.

SUMMARY OF THE INVENTION

This invention incorporates an air-motor-actuated hydraulic pump and a rotary valve to effectively close off the leakage path to the tank port for certain conditions of a tilt cab operation. The hydraulic system of this invention is similar to that disclosed in assignee's copending application Ser. No. 296,595, filed Oct. 11, 1972, now U.S. Pat. No. 3,841,693, entitled TILT CAB LATCH DEVICE. The air motor employs a cycling-valve-actuated piston similar to that described in assignee's above-referred-to U.S. Pat. No. 3,041,925 and No. 3,079,900. The air motor includes an inlet valve, which, once opened, supplies continuous pressure for actuation of the piston. A cycling valve alternately permits pressurization and exhaustion of the piston chamber whereby the piston continuously reciprocates. The piston in turn actuates a pumping piston in a hydraulic pump which pumps hydraulic fluid through a rotary directional control valve to a pair of lifting cylinders which are each operably disposed between the chassis and the cab. Connected in line between the lifting cylinders and the control valve are hydraulically actuated latching mechanisms which initially sense the rise in pressure when the pump is first actuated to move from the unlatched position just prior to the pumping pressure reaching a level to actuate the lifting cylinders. The conduits leading to each of the chambers of the double-acting lifting cylinders are provided with velocity fuses which energize (close) in the event that the cab falls at too great a speed during the free-fall mode due to failure of a hydraulic line or fitting to stop its movement. The system also incorporates means to insure that the latch hooks are in their unlatched position prior to the cab reaching its fully nested or regular position.

The rotary valve is a four-way directional valve having a neutral position. When in the neutral position and when the cab is in the raised but less than 45° position, the weight of the cab will generate a pressure in the lifting chambers of the lifting cylinders which pressure will be transmitted back to the cylinder port of the valve and will act on the rotary element to force it against the diametrically opposed wall of the housing to minimize leakage to the tank port which is located in the diametrically opposed wall.

BRIEF DESCRIPTION OF THE DRAWINGS

The above objectives of the invention will become more apparent to those skilled in the art by reference to the following detailed description when viewed in light of the accompanying drawings wherein:

FIG. 8 is a view taken along lines 8—8 of FIG. 6;

FIG. 9 is a schematic illustration of the hydraulic pump and manual override; and FIG. 10 is a cross sectional view in elevation of the latching mechanism check valve.

GENERAL

Figures 1, 2:
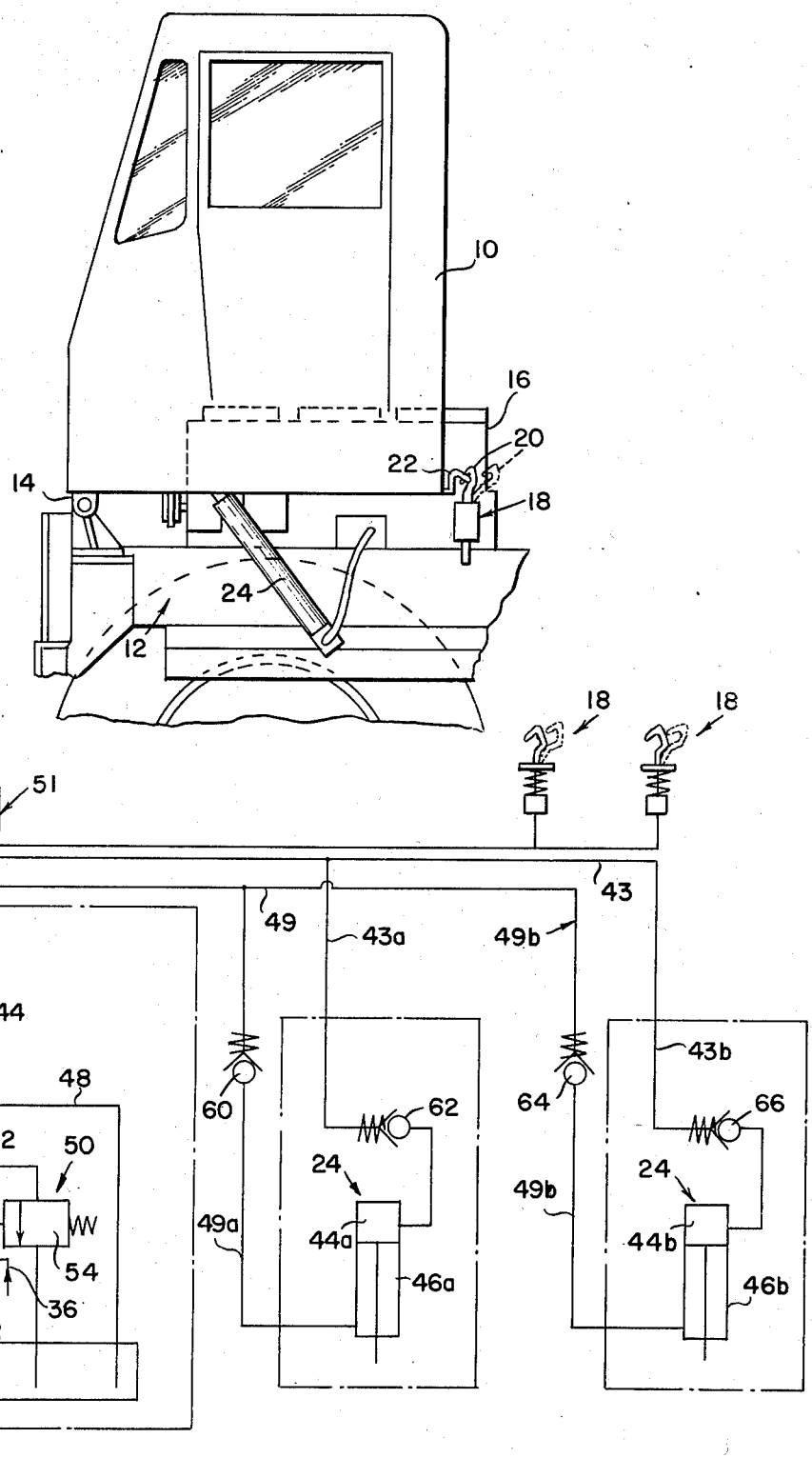
FIG. 1 is a side view in elevation of a tilt cab showing its pivotal connection with the chassis of a vehicle, one of its lifting cylinders and a latch.
FIG. 2 is a schematic illustration of the hydraulic circuitry of this invention.

Referring to the drawings wherein like numerals indicate like parts, the forward section of a vehicle is schematically illustrated in FIG. 1 and includes an operator's cab 10 which is pivotally attached to the forward end of chassis 12 at 14. The cab is shown in the normal position wherein it overlies the vehicle engine 16. A pair of latching mechanisms 18, one on each side, are attached to the chassis 12 and each includes a hook 20 which engages a fixed latching bar 22 which is mounted on the cab 10. The latching mechanism 18, of course, maintains the cab in position shown when the vehicle is in use. The latching mechanism is hydraulically actuated as will be explained more fully below. When it is desired to obtain access to the engine for repair or maintenance purposes, two lifting cylinders 24, one on each side of the chassis are actuated through energization of a hydraulic pump to tilt the cab about pivot point 14. The degree of extension of the lifting cylinders is controlled by a directional control valve to selectively position the cab 10 at any position between 0° and 90°. Prior to reaching the 45° position, the cab 10 exerts a downward pressure on the cylinders. After passing the over-the-center or 45° position, the weight of the cab 10 pulls outwardly on the cylinders.

A diagrammatic illustration of the hydraulic circuitry for supplying power to the lifting cylinders and latch mechanism is shown in FIG. 2. A power unit 30 is comprised of a hydraulic pump 32 and an air motor 34 which actuates the hydraulic pump. Air from a truck compressor or external source under approximately 60 to 100 lbs. p.s.i. is supplied to the air motor via line 36. The operation of the air motor 34 will be described in greater detail below. The air motor actuates a hydraulic piston in the pump 32 which receives hydraulic fluid from a reservoir 38 via line 40. Fluid is pumped through line 42 to a valve 44. The valve 44, as shown, is a three-position, four-way valve. When valve 44 is shifted to the right in the schematic illustration, the output from pump 32 is transmitted via line 42 to line 43 and then to lines 43a and 43b and to chambers 44a and 44b in double-acting, hydraulic cylinders 24. As pressure is supplied to chambers 44a and 44b, chambers 46a and 46b of the lifting cylinders 24 are exhausted to the reservoir 38 via lines 49a, 49b and line 49. The three positions of the valve 44 may be termed the tilt mode, the neutral mode, and the return mode.

When the valve 44 is in the tilt mode, chambers 44a and 44b are connected to the pump output and the chambers 46a and 46b are connected to the reservoir. When the valve 44 is in the rightmost position or the return mode, the chambers 46a and 46b are communicated to the pump output and the chambers 44a and 44b are communicated to the reservoir. When the valve is in the neutral or center position, the pressures in the respective chambers of the lifting cylinders 24 are maintained and each passageway therefrom is effectively blocked from the reservoir or pump output. The valve is shifted to the neutral or center position when it is desired to lock the cab in a selected tilted position.

An overload release bypass circuit 50 communicates line 42 with the reservoir 38 and includes line 52 and a pressure-responsive release valve 54 which communicates line 52 and thereby line 42 and the pump output to the reservoir 38 when the pressure in line 42 exceeds that required to lift the cab 10.

Each of the inlet-outlet conduits for the chambers of the lifting cylinders 24 are provided with velocity fuses. Velocity fuses 60 and 62 are in lines 49a and 43a respectively. Velocity fuses 64 and 66 are in lines 49b and 43b respectively. The velocity fuses operate in a manner to permit fluid flow at normal rates, while closing upon sensing sudden increases in flow rates in the lines if the cab is falling too fast due to failure of a hydraulic hose or fitting.

A latching mechanism 18 is provided on each side of the cab, and, as shown on FIG. 1, each is mounted on the chassis and engages and latching element 22 to maintain the cab 10 in the over-the-engine position. Of course, the parts can be reversed and the latching mechanism can be attached to the cab while the latching element 22 can be attached to the chassis. The latching mechanisms are normally closed, but are released in response to increases in pressure in line 42 via line 47 when the pump 32 is actuated to pressurize chambers 44a and 44b to tilt the cab forwardly. Relatively low pressure of approximately 300 to 700 p.s.i. are required to release the latching mechanisms; and, accordingly, the latching mechanisms are released before the cylinders respond to the pressure increases. The latching mechanism of this invention and the operation thereof is the subject of assignee's afore-mentioned copending application Ser. No. 296,595, and the disclosure of that application is incorporated herein by reference.

Briefly, each latching mechanism 18 includes a hook 20 which is mounted in a housing for movement first vertically and then laterally away from the vertical to the position shown in dotted lines in FIG. 1 and FIG. 2. When in the dotted line position, it is clear of the latching element 22 and the cab is free to be tilted. The hook is normally maintained in the full line closed position by means of a spring within the housing. It is urged to the open position by a hydraulic reciprocatory piston which is actuated in response to a pressure increase in line 47.

The latching mechanisms of this invention include an additional element not included in the invention described and claimed in the aforementioned copending application. This reference is to the check valve 51 illustrated diagrammatically in FIG. 2 and shown in detail in FIG. 10. The valve includes a housing 53 having a central bore 55 which receives a cylindrical insert and ball retainer 57. The insert 57 is provided with a central bore 59 having a port 61 at one end which communicates with line 47 leading to the latching mechanisms 18 and having an orifice 63 at the other end thereof. The orifice 63 is defined by valve seat 65 which receives a ball 67 which is normally urged into sealing engagement with the seat 65 by means of spring 69. The insert 57 has a reduced diameter end portion 71 defining with the bore 55 an annular chamber 73. The housing 53 is provided with an inlet port 75 which communicates with line 47 with reference to diagrammatical view of FIG. 2. Fluid under pressure from line 42 and line 47 enters the housing via port 75, flows through annular chamber 73 and into orifice 63 to unseat ball 67 against the bias of spring 69. The fluid under pressure continues to flow through the annular bore 59 and the insert 57, out of port 61 and to the latching mechanisms 18 to move hook 20 to the unlatched or open position shown in dotted line configuration in FIG. 2. The top end of the bore 55 terminates in a reduced diameter portion 81 which receives a sliding plunger 83 includes an extension 85 which, when the plunger is depressed, engages the ball 67 forcing it off of its seat and permitting fluid flow through orifice 63 to or from the latching mechanisms 18. The plunger 83 is normally urged out of engagement with the ball 67 by means of spring 87 which seats at one end against the shoulder 89 of the insert 57 and at the other end against the outer peripheral portion of a flange 91 on the underside of the plunger 83.

The valve 51 is positioned on the chassis such that when the cab 10 is in the fully seated position it engages the plunger 83 and depresses same to hold the ball 67 in the open position. Hence, the pressure will be reduced in the latching mechanisms 18 and they will be maintained in their locked position by means of the springs in the latching mechanism housings. Additionally, the line to the control valve 44 and hence to the pump 32 will be maintained open such that upon initiation of the operation of the tilting operation, the latching mechanisms will receive full pressure immediately and accordingly be actuated to move to the open or unlatched position, a condition that must precede the actuation of the lifting cylinders 24. As mentioned earlier, the latching mechanisms operate at lower pressures than the lifting cylinders 24 to insure the proper sequence of operation.

The purpose of the check valve is to maintain the latching mechanisms in the open position while the cab is in the tilted position. When the system is first energized, the latching mechanisms are opened and the cab will be tilted upwardly. As long as pressure is applied to lines 42 and 43 and hence to the lifting chambers of the cylinder 24, the latching mechanisms will be maintained in the open position. Once the cab reaches the central or 45° position and begins to free-fall mode to the 90° position, pressure in line 46 and line 47 will drop. However, the check valve 51 will maintain the appropriate unlatching pressure in mechanisms 18. In other words, since the cab is off of its seated position, the plunger will be in the up position as shown in FIG. 10 and the pressure in the lines leading to the latching mechanisms will be trapped by the seating of the ball 67. In the return mode, the opposite chamber of the lifting cylinders will be pressurized via line 49. When the cab reaches the over-the-center position and begins its free fall toward the 0° position, the weight thereof will pressurize the lifting chambers 44a and 44b and hence the pressure in line 43 and line 47 will increase. This pressure will be transmitted past the check valve 51 to the latching mechanisms 18 to insure that they are in an unlatched position when the cab reaches a seated position in the event there was a pressure loss in the latching mechanisms while the cab was tilted causing the hooks to close. Once the cab depresses the plunger 83, the ball 67 will be held in the open position and the pressure decrease in line 47 will be transmitted to the latching mechanisms to permit the latching mechanisms to move to the locked position. In applications where cab weight is insufficient to generate a pressure great enough to move the hooks to the fully unlatched position, the check valve maintains the hook in the fully unlatched position until the cab is fully down.

When it is desired to tilt the cab forward, the pump is actuated and the valve 44 is shifted to the rightmost position or to the tilt mode thereby pressurizing chambers 44a and 44b. The lifting cylinders 24 will be extended to tilt the cab 10 forwardly about pivot 14. Between 0° and 45°, the weight of the cab 10 will tned to nest the pistons within the cylinders 24. However, once the cab has gone beyond the 45° position, it is in a free-fall mode and exerts a pulling force on the lifting cylinders 24. The weight of the cab 10 will thereby pressurize the fluid that is being exhausted in chambers 46a and 46b. Fixed orifice restrictors 80 and 82 meter the flow of fluid from those chambers and retard the free-fall movement of the cab 10. In order to return the cab to its over-the-engine position, the valve 44 is shifted to the left and chambers 44a and 44b are exhausted to the reservoir. When the cab passes back through the 45°, it assumes a free-fall condition forcing fluid out of chambers 44a and 44b. The flow of fluid from these chambers is metered via means of fixed orifice restrictors 80 and 82 to retard the downward movement of the cab 10.

CONTROL VALVE

Figure 3:
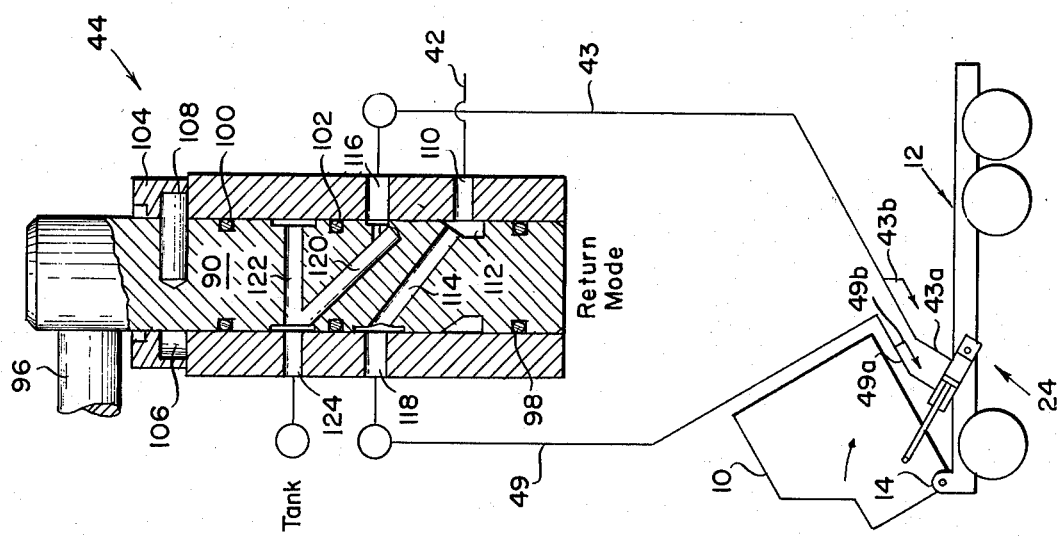
FIG. 3 is a cross-sectional view in elevation of the rotary valve of this invention showing it in the tilt mode.
Figure 4:
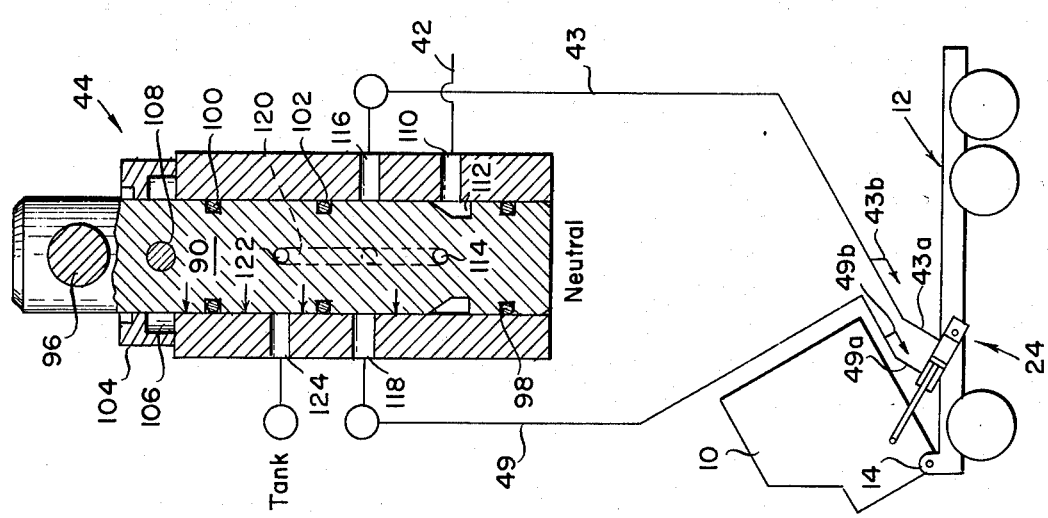
FIG. 4 is a view similar to that of FIG. 3 showing the valve in the neutral position.
Figure 5:
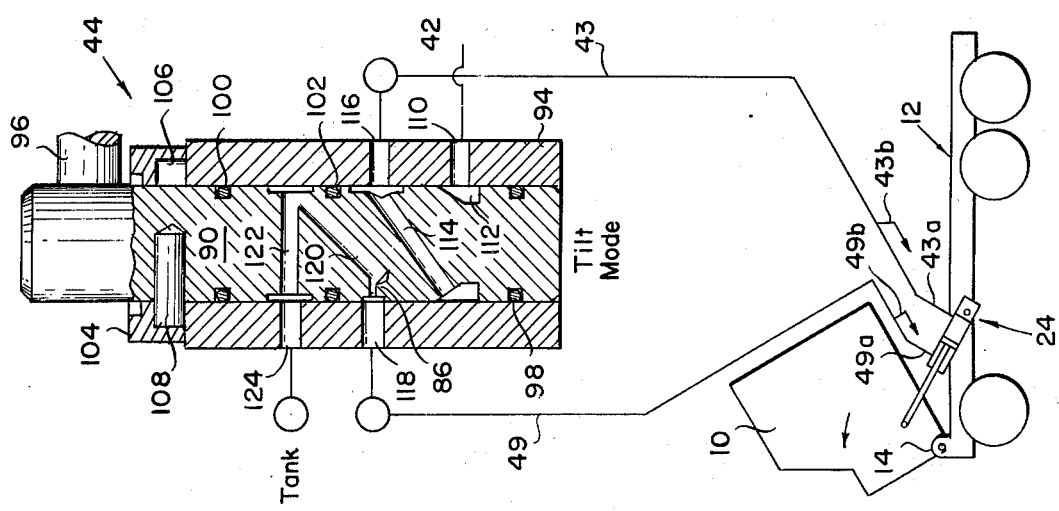
FIG. 5 is a view similar to that of FIG. 3 showing the valve in the position for returning the cab to the over-the-engine position.

The control valve 44 is illustrated in FIGS. 3 through 5 and comprises a valve having a rotary valve core 90 received in a bore in housing 94. The core 90 extends above the housing 94 and is provided with an actuating handle 96. A pair of O rings 98 and 100 seal the respective ends of the core 90 while intermediate O ring 102 separates and seals the tank port area from the pressure and cylinder port area.

A cap 104 is received around the core 90 and sets on top of the housing 94 and defines a chamber 106. A pair of set screws (not shown) are received in the cap 104 and project into the chamber 106. A guide pin 108 projects radially outwardly from the core 90 and is received in chamber 106 and engages the set screws which define teh limits of movement of the valve core 90. At one extreme position, the valve is in the tilt mode as shown in FIG. 3 and in the other extreme position the valve is in the return mode as shown in FIG. 5. Intermediate those two positions, the valve is in the neutral or closed position as shown in FIG. 4. When in the tilt mode, the pump output from line 42 is communicated to port 110 in the valve housing 94 which in turn communicates with annular chamber 112 in the valve core 90. Internal passageway 114 which extends through the core 90 communicates the chamber 112 with port 116 which is communicated to line 43 and then to the chamber 44a and 44b. The chambers 46a and 46b are communicated through line 49 to port 118 in housing 94. The fluid entering port 118 passes through restrictor 86 (there is only one restrictor in the valve, though for illustrative purposes, the diagrammatic showing of FIG. 2 indicates that there are two, 80 and 86) and then through passageways 120 and 122 to port 124 and line 48 which leads to the reservoir 38. The valve 44 is shifted to the return mode by turning it to the position shown in FIG. 5. In this position, chambers 46a and 46b of the lifting cylinders 24 are communicated to the pump output while chambers 44a and 44b are connected to the reservoir.

When the cab has reached a selected position, the valve is turned to the middle or neutral position as shown in FIG. 4 wherein the core blocks communications between the respective ports in the housing 94. The valve is quite effective in preventing leakage when the cab is in the less than 45° position. Oftentimes, the cab is raised to a less than 45° position when it is desired to make a summary check of the engine or to gain access to some portion thereof not requiring the full tilting of the cab. When in the less than 45° position, the weight of the cab tends to nest the pistons within the lifting cylinders. Therefore, the pressure exerted on the fluid in chambers 44a and 44b is quite substantial. Many valves are not sufficient to fully lock the cab in a less then 45° position in that a certain amount of the fluid from the chambers will leak to the tank port allowing the cab to creep downwardly. This is, of course, an unsafe and undesirable condition. In the particular valve embodiment of this invention, the pressure generated by the weight of the cab in the fluid line tends to effectively sea 1 the tank port in the valve against leakage. More particularly, with reference to FIG. 4, when the valve is in the neutral position, the pressures from line 43 react against the solid surface of the valve core 90 as indicated by the arrow in the port 116. This pressure tends to shift the core 90 toward the left and against the opposite side of the bore as indicated by the arrows. This will cause a tighter fit between the surface of the bore surrounding the reservoir port 124 and the surface of the core 90 to effectively minimize the amount of leakage through port 124. Thus, the cab will be prevented from creeping downwardly.

AIR-MOTOR HYDRAULIC PUMP

Figure 6:
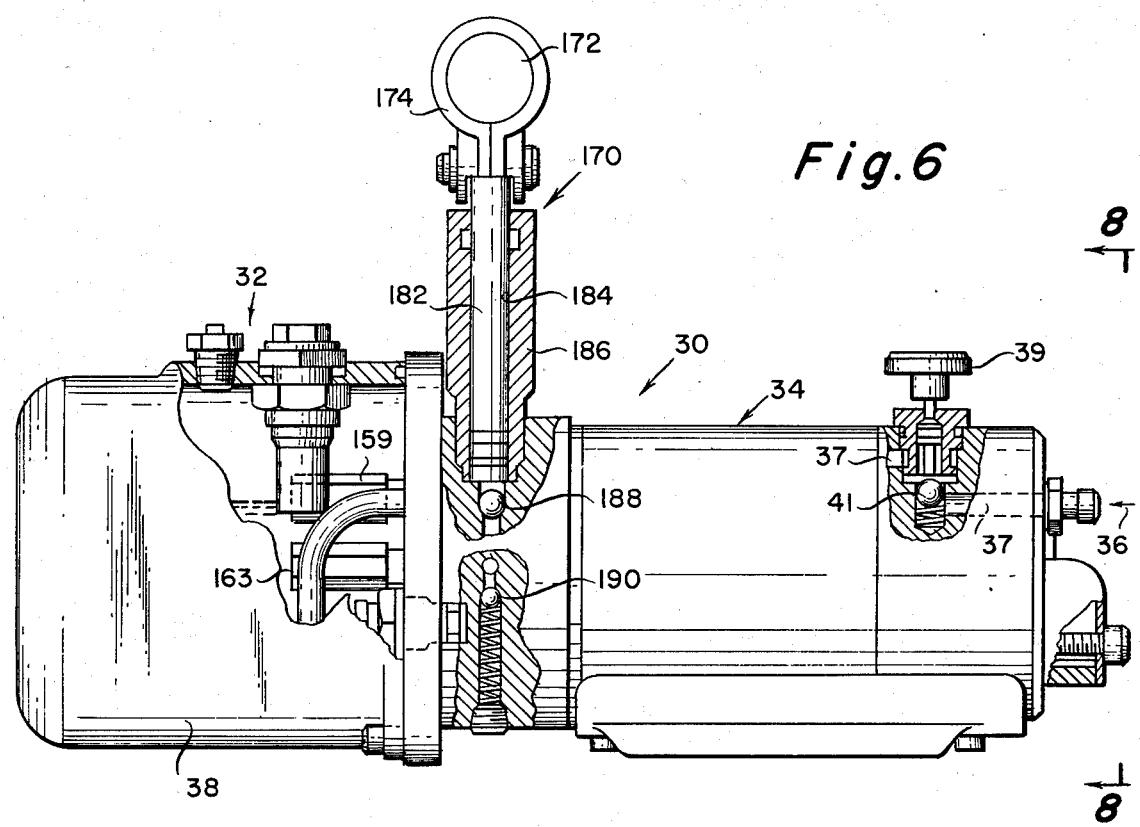
FIG. 6 is a view in elevation and partially in cross section of the air-motor-actuated hydraulic pump of this invention.
Figure 7:
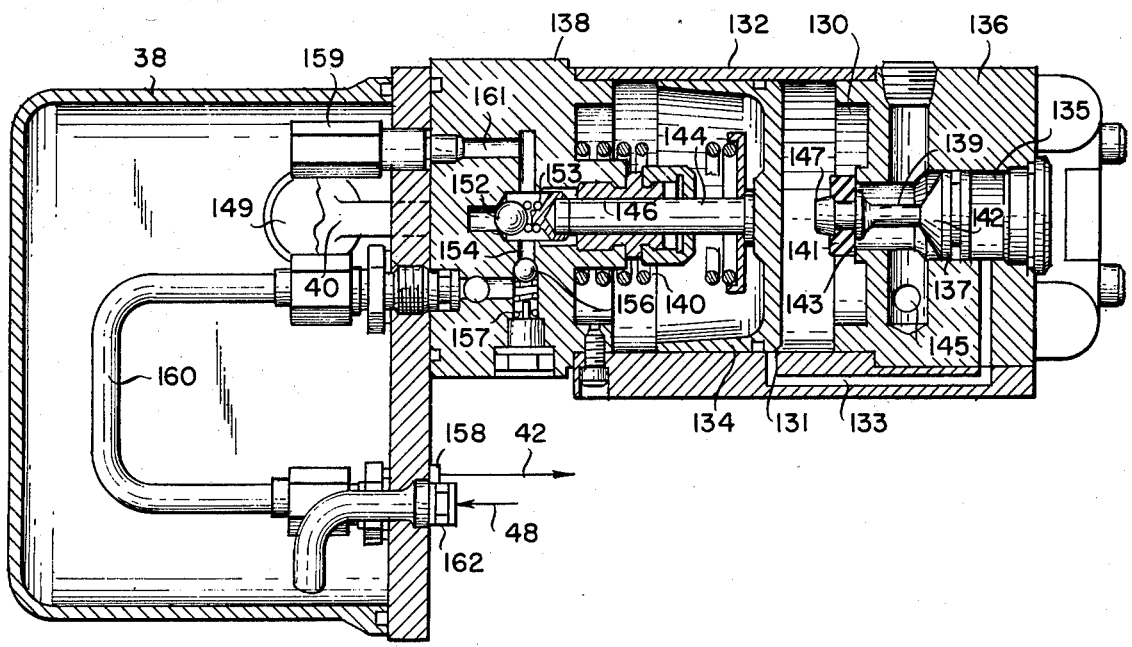
FIG. 7 is a plan cross sectional view of the air-motor actuated pump of FIG. 6.

FIGS. 6, 7 and 8 show the unit for applying hydraulic pressure to the lifting cylinders which comprises an air motor 34 and a hydraulic pump 32. This combination is similar in structure and operation to assignee's earlier U.S. Pat. No. 3,041,975, dated July 3, 1962, entitled FLUID ACTUATED HYDRAULIC POWER UNIT and U.S. Pat. No. 3,079,900, dated Mar. 5, 1963, entitled FLUID MOTOR. The housing 132 has a head portion 136 at one end thereof and at its other end is attached to housing 138 of pump 32. Air at a pressure from 60 to 100 p.s.i. is pumped from a suitable source through line 36 inlet passageway 37. A control button 39 controls valve 41 which normally blocks the inlet passageway and upon actuation opens the passageway to admit air under pressure to chamber 130 which receives reciprocating piston 134. A spring 140 is disposed between the pump housing 138 and the piston 134 and biases the latter toward the head 136 or to the right as viewed in FIG. 7. A cycling valve generally indicated by the numeral 142 is positioned in the head 136 and controls the alternate pressurization and exhaustion of chamber 130 to cause reciprocation of the piston 134. The operation of valve 142 and the air motor is explained in detail in U.S. Pat. No. 3,079,900. Briefly, when the actuator button 39 is actuated to open the valve 41, air is admitted to the chamber 130 driving the piston 134 to the left as viewed in FIG. 7. In the position shown in FIG. 7, the piston is substantially at the end of its stroke and is about to return to its normal starting position. The piston will continue to move to the left until to uncovers orifice 131 of passageway 133 which leads to chamber 135 behind valve piston 137. The valve piston is connected by means of a valve stem 139 to a poppet valve 141, which normally seals the opening 143. When the orifice is uncovered, the pressure in the chamber 130 is transmitted to the chamber 135 driving the piston 137 to the left thereby opening the poppet valve 141 and permitting pressure in the chamber 130 to exhaust to atmosphere via passageway 145. Upon depressurization of the chamber 130, the piston seeks its normal position at the urging of the compression spring 140. As the piston 134 returns to the right, the face of the piston engages the nose portion 147 of the poppet valve 141 forcing it again to the seated position. With the button 39 still depressed, the cycle is repeated. In other words, the chamber 130 will again become pressurized forcing the piston 134 to the left until the orifice 131 is uncovered, and so on.

The piston 134 drives a secondary piston 144 which is received in cylinder 146 in the hydraulic pump housing 138. A reservoir 38 is attached to the other side of the pump housing 138 and receives suction line 40 which is communicated with the pumping chamber defined by the piston 144 and cylinder 146 through check ball valve 152 which is normally seated by spring 153. The pumping chamber is communicated to an outlet passageway 154 and outlet check valve 156 which in turn is communicated to outlet fitting 158 via conduit 160. Valve 156 is normally seated by spring 157. With reference to the diagrammatic illustration of FIG. 2, fitting 158 receives line 42 and fitting 162 receives return the line 48. Relief valve 159 is communicated with the pumping chamber via passageway 161.

In operation, upon actuation of the button 39, air under pressure is admitted to chamber 130 to drive piston 134 to the left. The cycling valve 142 controls the alternate admissions and exhaustion of air under pressure into the chamber 130 and causes continuous reciprocation of the piston 134. This in turn causes continuous reciprocation of the hydraulic piston 144. On its withdrawal or suction stroke, hydraulic fluid is drawn out of reservoir 38 past screen 149 through conduit 40, past check valve 152 and into the pumping chamber. On the power stroke, the fluid is forced through the outlet passage 154 past check valve 156 and through conduit 160 to outlet fitting 158 and to line 42. Fluid from the cylinder chambers that are being exhausted returns to the reservoir via line 48.

With the reference to FIGS. 6 and 8, a manual override pump 170 in the form of a hand-operated piston pump is provided for use in the case of pneumatic pressure failure. A handle 172 is received in yoke 174 which is pivotally attached to a bracket 176 at 178. The yoke is likewise pivotally attached at 180 to the top of piston 182 which is received in bore 184 in housing 186. The housing 186 is fitted into the pump housing 138 as best seen in FIG. 6. As the handle 172 is lifted upwardly, the piston is lifted upwardly within the bore 184, to draw fluid from the reservoir 38, past ball valve 188 and into the pumping chamber defined by the bore 184 and piston 182. On the power stroke, the fluid is forced through outlet check valve 190 and eventually through line 42. The hand pump system is also provided with a pressure relief valve 163.

A diagrammatical illustration of the relationship between the air motor actuated pump and the manual override is shown in FIG. 9. The air motor drives piston 144 which, on the suction stroke, withdraws fluid from reservoir 38 through line 48 past check ball valve 152 into the pumping chamber. On the power stroke of the piston 144 the fluid is forced past check ball valve 156 through line 160 to outlet line 42 and then to the latching mechanisms and the lifting cylinders. The relief valve 159 communicates with the pumping chamber via line 161 on one side and with the reservoir 38 on the other.

The lever 172 of the manual override pump 170 drives piston 182 which on the suction stroke withdraws fluid from reservoir 38 through line 187 and check ball valve 188 to the pumping chamber. On the power stroke, fluid is forced past check ball valve 190 through line 191 to outlet 42. A second pressure relief valve 163 for the manual pump circuit is provided between the pumping chamber and the reservoir.

It can be seen that the combination air-motor-actuated hydraulic pump provides an efficient power unit for actuating the hydraulic lifting cylinders, and that the air pressure system on the vehicle itself may be utilized for applying power to the air motor. Additionally, in the event of the lack of sufficient air pressure source, the manual override pump 170 can be readily and efficiently utilized.

In a general manner, while there has been disclosed an effective and efficient embodiment of the invention, it should be well understood that the invention is not limited to such embodiment as there might be changes made in the arrangement, disposition, and form of the parts without departing from the principle of the present invention as comprehended within the scope of the accompanying claims.

I claim:

1. In a motor vehicle having an elongated chassis, a cab, means pivotally mounting said cab on said chassis about an axis transverse to the longitudinal axis of said chassis, a double-acting, fluid-pressure-actuated piston and cylinder assembly having one end connected to said chassis and the other end connected to said cab for moving said cab from a normally lowered first position, to a partially raised, 45° second position, and to a fully raised, 90° forwardly tilted third position, said cab by the weight thereof urging said piston and cylinder to expand when between said second and thrid position, latch means between said chassis and cab to lock said cab in said first position, a hydraulic pump, a fluid reservoir, a directional flow control first valve, first conduit means connecting said cylinder to said first valve, second conduit means connecting said cylinder to said first valve, and third conduit means connecting said pump and said reservoir to said first valve, the improvement comprising pulsating pneumatic motor means for driving said pump, said latch means being fluid pressure actuated, fourth conduit means communicating said latch means to said first conduit means, said latch means movable from a normally closed position to an open position in response to a predetermined increase in pressure in said first conduit means, a second valve in said fourth conduit means preventing return fluid flow from said latch means when said cab is in a tilted position, and actuator means activated by said cab prior to its reaching said first position to maintain said second valve in the open position.

2. The vehicle of claim 1 wherein manual over-ride pumping means is provided to supply pressurized fluid to said cylinder in the event of a failure in said hydraulic motor or said pneumatic motor.

3. The vehicle of claim 1 and including a second piston and cylinder assembly communicated to said first conduit means, said piston and cylinder assemblies being disposed on opposite sides of said cab.

4. The vehicle of claim 1 wherein said first valve is a four-way, three-position valve.

5. The vehicle of claim 4 wherein said first valve is a rotary valve and comprises a housing having a longitudinally extending bore, a rotatable cylindrical valve core snugly received in said bore for rotation about its longitudinal axis therein, reservoir and a pair of cylinder port means in said housing, one of said cylinder port means being diametrically opposed to said reservoir port means, pressure port means in said housing said second conduit means comprising an output conduit between said valve and said pump and a return conduit between said reservoir, said pressure port means being connected to said output conduit, said return conduit to said reservoir port means and said one cylinder port means to said first passageway means, passageway means in said valve core for alignment with said ports whereby by rotating said core said cylinder port may be selectively communicated to either said pressure port means or said reservoir port means, and said valve having a neutral position wherein said passageway means is out of alignment and out of communication with each of said port means and wherein any back pressure exerted in said first conduit means and through said one cylinder port means tends to urge said core against the opposite wall of said bore to seal the area surrounding said diametrically opposed reservoir port.

6. A latch system for a motor vehicle having an elongated chassis, a cab, means pivotally mounting said cab on said chassis about an axis transverse to the longitudinal axis of said chassis, a double-acting fluid-pressure-actuated piston and cylinder assembly having one end connected to said chassis and the other end connected to said cab for moving said cab from a normally lowered position, to a partially raised, 45° second position, and to a fully raised, 90° forwardly tilted third position, said cab by the weight thereof urging said piston and cylinder to nest when between said first and second positions and to expand when between said second and third positions, a hydraulic pump,
a fluid reservoir,
a directional flow control valve,
first conduit means communicating said cylinder to said valve, and
second conduit means communicating said pump and said reservoir to said valve,
latch means between said chassis and cab to lock said cab in said first position,
third conduit means communicating said latch means to said first conduit means and said latch means movable from a normally closed position to an open position in response to a predetermined increase in pressure in said first conduit means,
valve means in said third conduit means preventing return fluid flow from said latch means when said cab is in a tilted position, and
actuator means by said cab just prior to its reaching said first position to maintain said valve means in said third conduit means in the open position.

7. The system of claim 6 wherein said valve means in said third conduit means is a ball check valve and said actuator means is a plunger normally biased out of engagement with said ball but adapted to engage and unseat said ball upon being depressed by said cab as it nears the first or lowered position.

8. The system of claim 6 wherein safety means are provided to block fluid flow from said cylinder assembly upon a sensing of fluid flow faster than a preselected value.

9. The system of claim 6 and including a pneumatic motor for driving said hydraulic pump.

10. The system of claim 9 wherein a manual override pumping means is provided to supply pressurized fluid to said cylinder in the vent of a failure in said pneumatic motor.

* * * * *